Sept. 30, 1958
R. MENNESSON
2,853,874
APPARATUS FOR MEASURING LEAKS
Filed Oct. 24, 1955
3 Sheets-Sheet 1
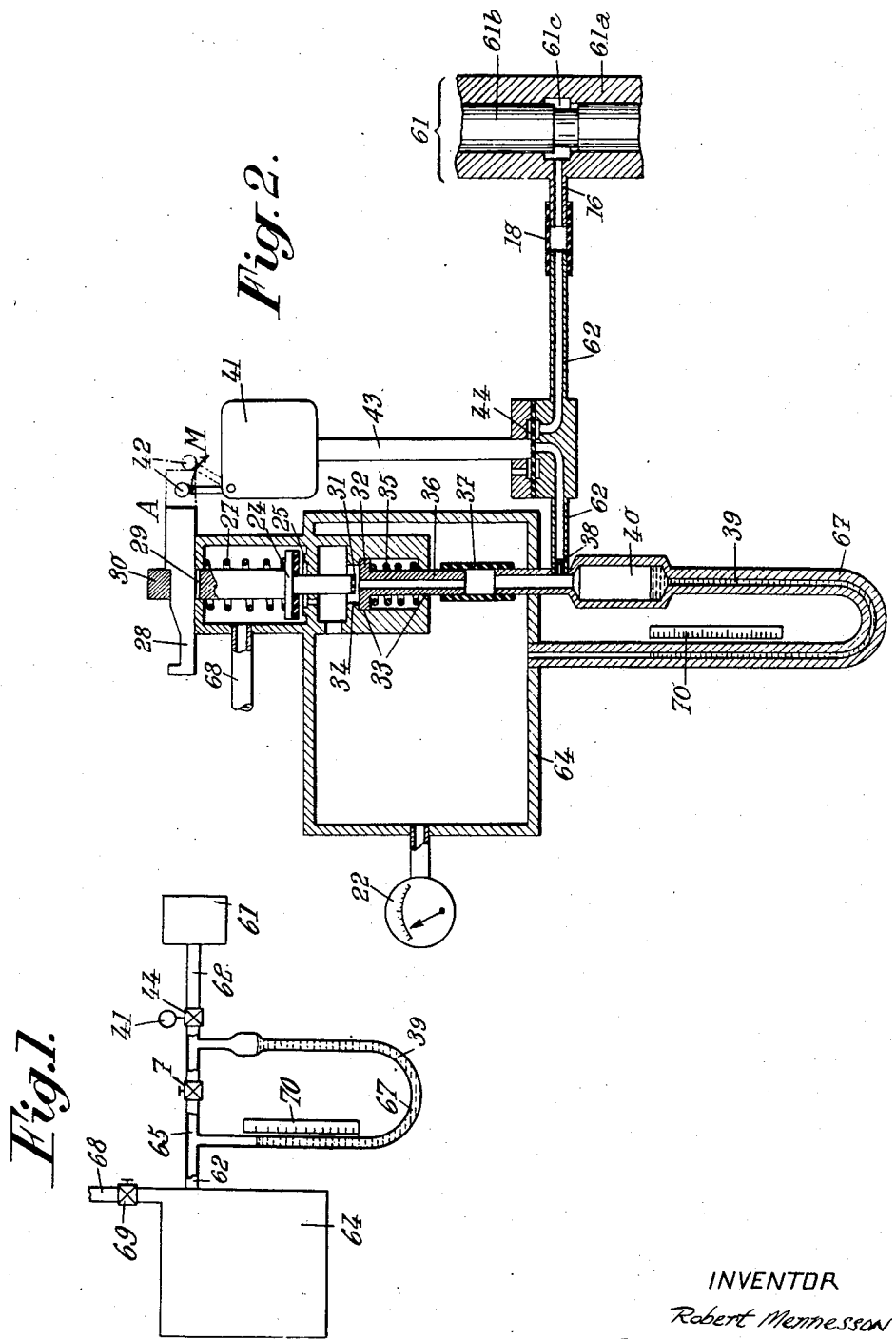
INVENTOR
Robert Mennesson
BY
ATTORNEYS

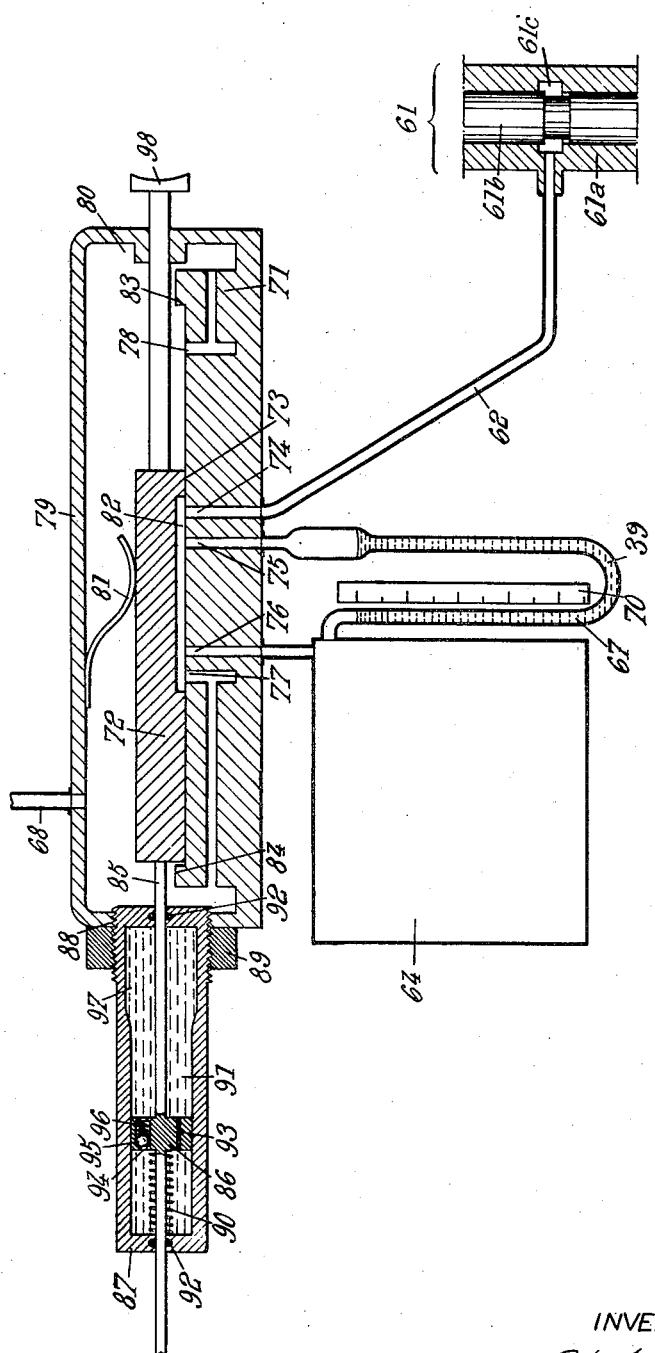

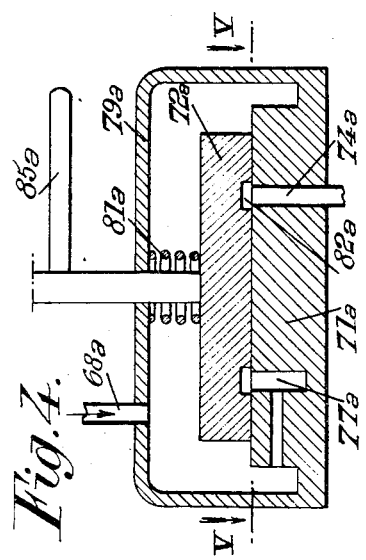

United States Patent Office 2,853,874
Patented Sept. 30, 1958

2,853,874

APPARATUS FOR MEASURING LEAKS

Robert Mennesson, Neuilly-sur-Seine, France, assignor to Société d'Applications et de Constructions pour Matériel Automobile S. A. C. M. A., Neuilly-sur-Seine, France, a society of France Application October 24, 1955, Serial No. 542,285

Claims priority, application France Oct. 30, 1954

5 Claims. (Cl. 73—40)

The present invention relates to apparatus for measuring the leaks existing in a structure forming a closed chamber.

Such apparatus comprise conduit means interposed between a source of fluid under pressure and said chamber, said conduit means including on the one hand a tube (preferably a U-tube with vertical branches) having a transparent portion containing an indicator liquid column the position of which can be measured by means of a graduated scale placed along said tube portion, and on the other hand a by-pass conduit branch between the ends of said tube, a valve being provided in said by-pass conduit branch and another valve in the portion of said conduit means extending between said chamber and the downstream junction of said tube with said by-pass conduit branch.

Such apparatus can work in a satisfactory fashion, and in particular achieve an accurate measurement of leaks only if these valves are operated at given time intervals.

The object of the present invention is to provide an apparatus of the above mentioned kind which is better adapted to meet the requirements of practice than those existing at the present time.

The essential feature of my invention consists in providing a combination of means for closing said first mentioned valve and means operatively connected with said valve closing means for automatically closing said second mentioned valve a predetermined time after the closing of said first mentioned valve.

Preferred embodiments of the present invention will be hereinafter described with reference to the accompanying drawings, given merely by way of example and in which:

Fig. 1 is a diagrammatical view illustrating the principle of operation of an apparatus according to the present invention.

Fig. 2 is a more detailed view of a first embodiment of the apparatus according to the present invention.

Fig. 3 is a view similar to Fig. 2 but showing another embodiment of the invention.

Fig. 4 is a vertical sectional view on the line IV—IV of Fig. 5, showing a modification.

Fig. 5 is a horizontal sectional view on the line V—V of Fig. 4.

Fig. 6 is a developed sectional view on the line a—c—d—e—f—g—h of Fig. 5

It will be supposed that it is desired to detect and measure leaks occurring in a closed chamber such as 61 (Fig. 1).

The apparatus includes a conduit 62 interposed between said chamber 61 and a suitable source 64 of air or another fluid under pressure. Such conduit means 62 include a tube 67 at least a portion of which is made of a transparent or translucent material and contains a column of an indicator liquid 39. Advantageously, tube 67 is in the form of a U tube and the branches of the U are substantially vertical. A by-pass conduit branch 65 provided with a valve 7 is inserted between the ends of tube 67.

Advantageously, the source 64 of air under pressure is such that the pressure of the air it supplies remains constant at least during the measurement operation. For this purpose this source 64 may be constituted by a reservoir of large volume as compared with the volume of the column of indicator liquid. This reservoir 64 may be cut off by means of a valve 69 from its feed conduit 68 connected with a pump or other source of fluid under pressure.

Valves 7 and 69 are interconnected so as to be operated either simultaneously or at a short time interval so as to cut off, on the one hand the connection between reservoir 64 and its feed conduit 68 and, on the other hand, the connection between the ends of U tube 67.

In the portion of conduit means 62 extending between the downstream end of U tube 67 and chamber 61, there is provided a valve 44 controlled by a time measuring system 41 operatively connected with valve 7 so that it closes valve 44 a predetermined time after valve 7 has been closed.

The operation of this apparatus is as follows. The apparatus is connected with the chamber 61 to be tested and valves 7 and 69 are then opened same as valve 44. Reservoir 64 is fed with air at the desired pressure through conduit 68. The pressures upstream and downstream of liquid column 39 are balanced due to the fact that bypass valve 7 is open. Valves 7 and 69 are then closed.

If there are leaks in the structure forming chamber 61, the liquid column 39 moves toward this chamber at a rate depending upon the importance of the leaks. This rate is measured by the total displacement of the liquid column after a given time interval, for a given pressure existing in reservoir 64. Device 41, which automatically limits the leaks to said time interval therefore permits of reading, on a suitable scale 70 placed along one branch of tube 67, the value of the leaks.

According to a first embodiment of the invention, shown by Fig. 2, the apparatus is made as follows:

It is for instance intended to detect and measure leaks in an annular chamber 61c existing between a cylinder 61a and a piston 61b. Cylinder 61a is provided with a connection 16 provided with a hole through which it can be fed with compressed air. This connection 16 is in communication with conduit means 62 through a sleeve 18 consisting for instance of a rubber tube. Reservoir 64 may be provided with a pressure gauge 22.

The communication between feed conduit 68 and reservoir 64 is controlled by a valve member 24 cooperating with a seat 25. Valve member 24 is urged toward its seat 25 by a spring 27. It is actuated by a cam 28 movable transversely in an aperture 29 provided in the rod 30 of valve member 24. The whole of elements 24, 25, 27 and 28 corresponds to the above valve means 69 of Fig. 1.

Rod 30 is also the rod of another valve member 31 cooperating with a seat 32 slidable in two guides 33 and the movement of which it limited in the upward direction by a shoulder 34. A spring 35 urges said seat 32 toward shoulder 34, this spring 35 being of a strength lower than that of spring 27. Seat 32 is located at the end of a conduit 36 connected with the end of the right hand branch of U tube 67 through a rubber sleeve 37. Valve 31—32 corresponds to the by-pass valve 7 of Fig. 1.

Conduit means 62 include a portion 38 of restricted cross section as compared with the diameter of conduit 36 in order to avoid undesirable pressure drops. The branches of the U tube 67 are filled, up to a suitable level, with a colored liquid 39 (for instance alcohol).

The right hand branch of the U tube includes an enlarged portion 40 to collect liquid from tube 67 and to prevent it from passing into conduit means 62 when the valve means operate unsatisfactorily or when there is too much leakage in the device 61 to be tested, or again when it has been forgotten to mount said device at this place.

The apparatus further includes an adjustable time measuring device 41 (which may be of electrical, mechanical, hydraulic or other type) started by a lever 42 when this lever is moved from its stopping position A to its working position M. This lever is controlled by cam 28 so as to be brought from position A to position M when the valve means 24—25 and 31—32 are closed by said cam 28.

The operation of this apparatus is as follows.

Valve members 24 and 31 being open, sleeve 18 is fitted on connection 16. Pressure gauge 22 indicates whether the pressure in reservoir 64 is correct (this pressure exists both upstream and downstream of the liquid column 39).

Cam 28 is then moved toward the right, which produces the following results:

(a) Valves 24 and 31 are closed practically simultaneously;

(b) Lever 42 is shifted from position A to position M.

If there are no leaks, the level of the liquid column in the left hand branch of U tube 67 does not change.

If, on the contrary, there are leaks between cylinder 61a and piston 61b, a portion of the air located inside the space corresponding to pieces 16, 18, 62, 36 and 40 escapes to the atmosphere, since it is under a pressure higher than the atmospheric pressure.

The level then drops in the left hand branch of U tube 67 at a rate proportional to the importance of the leak.

When lever 42 has been in position M for a predetermined time, device 41 operates a rod 43 connected with valve 44 so as to close said valve.

It then suffices to read on a scale 70 the displacement of the liquid level in the left hand branch of tube 67.

It should be noted that as air is leaking out, the pressure upstream of column 39 is reduced. When the branches of the U are vertical as shown by Fig. 1, this is not very important if the operations are conducted with high pressures in reservoir 64 because the variations of pressure due to the displacement of the liquid in the U tube are at most of some tens of grams and correspond to a very low percentage of the total pressure existing in reservoir 64.

Besides the pressure decrease in reservoir 64 is relatively small since the inner cross section of the left hand branch of tube 67 is very small.

It has been supposed that the fluid used for the operation is air under pressure but the same advantages could be used with other gases and even with liquids.

According to another embodiment of the invention, shown by Fig. 3, the apparatus is made as follows. It includes, as that of Fig. 2, the following elements: conduit means 62, a U tube 67, a graduated scale 70, a reservoir 64 and a feed conduit for air under substantially constant pressure 68.

As in the preceding example, the chamber which is to be tested is constituted by the space 61c between a cylinder 61a and a piston 61b.

The valves disclosed by Fig. 2 are replaced in this case by the following device: two parts 71 and 72 are slidable on each other along a common plane 73. Part 71 includes a plurality of channels, to wit channel 74 connected to conduit means 62, channel 75 connected to one of the branches of U tube 67 and channel 76 connected to reservoir 64.

Part 71 forms a chamber 80 into the upper wall 79 of which opens conduit 68. Bent conduits 77 and 78 provided in part 71 on the one hand open into the flat face 73 thereof, and on the other hand communicate laterally with chamber 80.

A spring 81 applies upon the flat face 73 of piece 71 the part 72 provided with a groove 82 intended to cooperate with the upper ends of channels 74, 75, 76, 77 and 78.

Part 71 is provided with two abutments 83 and 84 for limiting the displacements of part 72 with respect to part 71. Groove 82 and the channels 74, 75, 76, 77 and 78 are so dimensioned that in the two end positions of piece 72, groove 82 connects together either channels 74, 75, 76 and 77, or channels 74 and 78 (channel 75 being excluded in the second case).

The operation of this device is as follows: part 72 being in the position shown in Fig. 3 such that it connects together channels 74, 75, 76 and 77, the same pressure exists in chamber 80 as in reservoir 64 and conduit means 62. The situation is then the same as when, in the diagrammatical view of Fig. 1, valves 44, 7 and 69 are open.

If part 72 is moved toward the right, it first closes the end of channel 77 and the situation is the same as when, in the diagrammatical view of Fig. 1, valve 69 is closed.

If part 72 is further moved in the same direction, the orifice of channel 76 is closed, which corresponds to the closing of the valve 7 of Fig. 1.

When the movement of part 72 is continued, said part closes the orifice of channel 75, which corresponds to the closing of valve 44 in the diagrammatical view of Fig. 1. At the end of the displacement of part 72, conduit means 62 are again brought into communication with chamber 80 through orifice 78, which does not exist in the case of the arrangement of Fig. 1.

As soon as the orifice of channel 75 is closed, the levels in tube 67 remain fixed and this permits of reading the value of the leaks on scale 70. Of course, part 72 is arranged in such manner that, when it places the orifices of channels 74 and 78 in communication with each other, the orifices of channels 75, 76 and 77 remain closed.

In order to have a true measurement of the leaks, the displacement of part 72 with respect to part 71 must take place at a given speed, the orifices of the channels and part 71 having been located at suitable distances from one another. In order to obtain the steady movement of part 72, use is made of a push-piece 85 actuated by a piston 86 movable in a cylinder 87 fixed for instance to casing 79 by screw-threads 88, the whole being stopped by a nut 89.

Piston 86 is moved by a spring 90 and cylinder 87 contains a liquid 91. Packing joints 92 prevent liquid 91 from flowing out from cylinder 87. Piston 86 is provided with a small orifice 93 and also with a second orifice 94 which may be stopped by a ball (or other check valve) 95 held by a spring 96, thus facilitating the displacement of piston 86 in one direction and braking it in the opposed direction.

Cylinder 87 may be provided with one or several recesses 97 which permit a quicker movement of piston 86 when said piston reaches said recesses.

The speed of displacement of part 72 may be adjusted either by adjustment of spring 90, or by adjusting the position of cylinder 87 with respect to casing 79 by means of screw-threads 88 and nut 89.

Finally, a push-piece 98 permits of returning piston 86 in its initial position for a new operation.

It should be noted that casing 79 is very important because it permits of using the pressure existing in chamber 80 to apply part 72 against part 71, this action being added to that of spring 81.

Furthermore, the pressures existing in chamber 80 and in groove 82 are then substantially equal, which permits of avoiding any leak in the plane of contact 73 of parts 71 and 72.

Of course, the arrangement as above described is only given by way of indication and it will be easily understood that, as shown by Figs. 4 to 6, the above mentioned channels might be located at 74a, 75a, 76a, 77a and 78a in a cylindrical piece 71a cooperating with a rotatable part 72a and, in this case, push-piece 85 would be replaced by a manually operated lever 85a rigid with part 72a so as to cause said part to rotate with respect to the above mentioned cylindrical piece 71a.

However, the rotation of part 72a may also be produced, if so desired, by a piston similar to piston 93 of Fig. 3 and moving in a cylinder 87a, said piston carrying a rack 85b in mesh with a pinion 99 rigid with rotatable part 72a (as shown by Fig. 5, these elements 85b, 87a and 99 being not shown on Figs. 4 and 6).

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for measuring the leaks existing in a structure forming a closed chamber which comprises, in combination, a source of fluid under constant pressure, conduit means interposed between said source and said chamber, said conduit means including on the one hand a tube having a transparent portion and on the other hand a bypass conduit branch between the ends of said tube, an indicator liquid column in said tube, a graduated scale along said transparent tube portion, a bypass valve in said by-pass conduit branch, a valve in the portion of said conduit means extending between the downstream junction of said tube with said by-pass conduit branch and said chamber, means for closing said first mentioned valve and means operatively connected with said valve closing means for automatically closing said second mentioned valve a predetermined time after the closing of said first mentioned valve.

2. An apparatus for measuring the leaks existing in a structure forming a closed chamber which comprises, in combination, a source of fluid under constant pressure, conduit means interposed between said source and said chamber, said conduit means including on the one hand a U-tube having its branches at least substantially vertical and at least a portion of one branch of which is transparent, and on the other hand a by-pass conduit branch between the ends of said tube, an indicator liquid column in said tube, a graduated scale along said transparent tube portion, a by-pass valve in said by-pass conduit branch, a valve in the portion of said conduit means extending between the downstream junction of said tube with said by-pass conduit branch and said chamber, means for closing said first mentioned valve and means operatively connected with said valve closing means for automatically closing said second mentioned valve a predetermined time after the closing of said first mentioned valve.

3. An apparatus for measuring the leaks existing in a structure forming a closed chamber which comprises, in combination, a large volume fluid reservoir, a source of fluid under pressure, means including a valve for connecting said source with said reservoir, conduit means interposed between said reservoir and said chamber, said conduit means including on the the one hand a U-tube having its branches at least substantially vertical and at least a portion of one branch of which is transparent and on the other hand a by-pass conduit branch extending between the ends of said U-tube, an indicator liquid column in said U-tube, a graduated scale along said transparent tube portion, a valve in said by-pass conduit branch, a valve in the portion of said conduit means extending between said chamber and the downstream junction of said tube with said by-pass conduit branch, means for closing said two first mentioned valves and means operatively connected with said valve closing means for automatically closing said third mentioned valve a predetermined time after the closing of said second mentioned valve.

4. An apparatus according to claim 3 in which the means for closing said two first mentioned valves include a cam and the means for closing said third mentioned valve consist of a delayed action device operatively connected with said cam for being started when said cam is actuated and including a member arranged to act on said third mentioned valve.

5. An apparatus according to claim 3 in which said three valves are grouped and form together a multiple slide valve, the two last mentioned means of said claim 3 being constituted by a power mechanism for operating said slide valve.

References Cited in the file of this patent

UNITED STATES PATENTS

| 1,901,432 | Bradley | Mar. 14, 1933 |
| 2,493,967 | Hendricks | Jan. 10, 1950 |
| 2,531,607 | Bryant | Nov. 28, 1950 |
| 2,684,593 | Rothstein | July 27, 1954 |
| 2,719,426 | Lamb et al. | Oct. 4, 1955 |